H. O. JOHNSON.
PNEUMATIC TIRE.
APPLICATION FILED NOV. 27, 1914.

1,158,227.

Patented Oct. 26, 1915.

WITNESSES:
Madge Norton
John H. Norton

INVENTOR.
Henry O. Johnson
BY
James T. Watson
ATTORNEY.

UNITED STATES PATENT OFFICE.

HENRY O. JOHNSON, OF VIRGINIA, MINNESOTA.

PNEUMATIC TIRE.

1,158,227.     Specification of Letters Patent.     Patented Oct. 26, 1915.

Application filed November 27, 1914. Serial No. 874,118.

*To all whom it may concern:*

Be it known that I, HENRY O. JOHNSON, a citizen of the United States, residing at Virginia, in the county of St. Louis and State of Minnesota, have invented certain new and useful Improvements in Pneumatic Tires, of which I do hereby declare the following to be a specification.

My invention relates to pneumatic tires and has for its object the provision of an improved cover for protecting the tread of the air tube against puncture.

With this and other objects in view, it consists of the structures, combinations and arrangements of parts hereinafter described and claimed.

Figure 1:
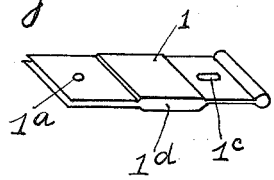
Figure 2:
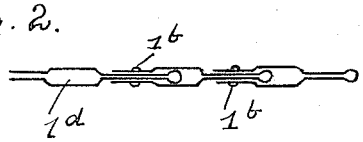
Figure 3:
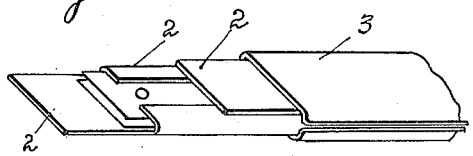
Figure 4:
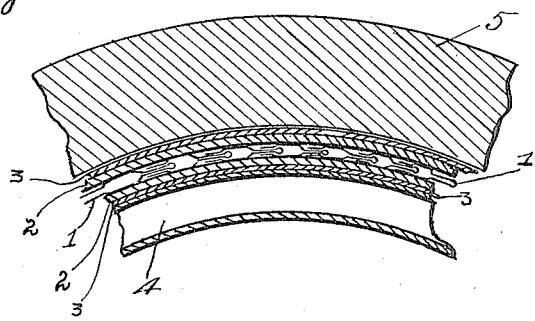

In the drawings, Figure 1, is a perspective view of a link of a protecting chain forming part of my said invention, Fig. 2, is a side elevation of several of said links connected together, Fig. 3, is a perspective view of a section of casing forming part of my said invention, and of a portion of said chain lying therein. Fig. 4, is a vertical longitudinal section of a segment of a tire embodying my said invention.

In the drawings, 1 is a link preferably constructed of a piece of steel tape bent into the form of a loop. The adjoining branches of said loop are preferably apertured near their free ends as at $1^a$ for the passage of any suitable connecting means, as a rivet $1^b$ and said branches also preferably have formed therein near the closed end of said loop a longitudinally directed slotted aperture $1^c$ for the passage of the rivet $1^b$ of the adjoining link. Intermediate of its closed and the open ends said loop is preferably expanded slightly, as at $1^d$, to provide a space between its branches for the closed end of the adjoining link, and intermediate of said expanded portion and the closed end of said links respectively, the opposing faces of the branches of said link nearly contact with each other. Any suitable number of said links are assembled to form a chain, in which the open end of one link receives the closed end of the adjoining link. Said chain is then curved to form a circle, and the terminal links may be engaged with each other in the same manner as the intermediate links are engaged. It will be observed that the slotted aperture $1^d$ permits of a suitable amount of longitudinal play of one link upon the other. If desired, the aperture $1^d$ may be circular and the aperture $1^a$ may be slotted. A suitable casing of any suitable material is provided for said chain, preferably comprising interior walls 2, of asbestos, which may be constructed of separate strips or may be constructed in tubular form, as desired, and outer walls 3, of canvas or other fabric. I do not however desire to limit myself to any special casing-structure or material except as to such of my claims as particularly specify such structure or materials. After said chain has been inserted in said casing and the ends of the chain connected together, if it is desired to connect them, the ends of said casing may, if desired be stitched, or cemented, or otherwise connected together in any suitable manner. In operation, said chain, or chain and casing are positioned in the tire between the air tube therein and the outer body of the tire so as to encircle said air tube longitudinally and prevent any sharp or pointed article or instrument from extending through the tread of the outer body of the tire to such air tube.

In the drawings, 4 is an air tube or chamber of pneumatic tire and 5 is an exterior body portion of said tire. If desired, the air tube or chamber may be formed in said body portion instead of separate from it.

What I claim is:—

1. In a pneumatic tire, the combination of an interior air tube, an exterior body portion, a chain of looped metallic links, the open end of each loop extending above and below the closed end of the following link, said links being adapted to play longitudinally for a limited distance with respect to each other, and a casing inclosing said chain, said chain and casing being positioned between said air chamber and the outer face of said body portion and being adapted to encircle said air chamber longitudinally.

2. A pneumatic tire, having an air chamber therein extending longitudinally thereof, said tire embodying a chain of looped metallic links positioned therein between said air chamber and the outer face of said tire, each of said looped links having a closed end and an open end, said chain being adapted to encircle said chamber longitudinally, said links being adapted to play longitudinally for a limited distance with respect to each other, the branches of each of said links extending respectively above and below the closed end of the next following link in said chain.

3. A pneumatic tire containing an air chamber extending longitudinally thereof, said tire embodying a series of looped metallic-tape bodies, said series being adapted to encircle said air chamber longitudinally thereof, each of said looped bodies being expanded slightly intermediate of its closed and open end, the branches of each of said bodies extending respectively above and below the closed end of the next following of said bodies, one of the branches of each of said bodies having a longitudinally directed slot formed therein, one branch of each of said bodies having an aperture formed therein, each of said bodies being connected with an adjoining one of said bodies by means extending through said aperture in one of them and through said slot in such adjoining one.

In testimony whereof I hereunto affix my signature, in presence of two witnesses.

HENRY O. JOHNSON.

Witnesses:
C. L. JUDD,
K. J. F. KARLSON.